United States Patent

Wang (10) Patent No.: US 6,710,833 B2
(45) Date of Patent: Mar. 23, 2004

(54) MULTI-DOMAIN VERTICAL ALIGNMENT LIQUID CRYSTAL DISPLAY WITH WIDE VIEWING ANGLE

(75) Inventor: Yi-fang Wang, Chang Hua (TW)

(73) Assignee: Hannstar Display Corporation (TW)

( * ) Notice: Subject to any disclaimer, the term of this patent is extended or adjusted under 35 U.S.C. 154(b) by 324 days.

(21) Appl. No.: 09/833,937

(22) Filed: Apr. 11, 2001

(65) Prior Publication Data
US 2002/0001058 A1 Jan. 3, 2002

(30) Foreign Application Priority Data
Jun. 30, 2000 (TW) .................................. 89113066 A (51) Int. Cl.$^7$ .......................................... G02F 1/1337
(52) U.S. Cl. ........................................ 349/130; 349/128
(58) Field of Search .................................. 349/128, 130

(56) References Cited

U.S. PATENT DOCUMENTS

| | | | | |
|---|---|---|---|---|
| 6,097,464 A | * | 8/2000 | Liu | 349/130 |
| 6,313,899 B1 | * | 11/2001 | Wu et al. | 349/130 |
| 6,424,397 B1 | * | 7/2002 | Kuo | 349/139 |
| 6,426,786 B1 | * | 7/2002 | Lu et al. | 349/125 |
| 6,476,896 B1 | * | 11/2002 | Liu | 349/129 |
| 6,512,503 B1 | * | 1/2003 | Kim et al. | 345/87 |

* cited by examiner

Primary Examiner—Tarifur R. Chowdhury
Assistant Examiner—P. R. Akkapeddi
(74) Attorney, Agent, or Firm—Martine & Penilla, LLP (57) ABSTRACT

A "Multi-domain Vertical Alignment Liquid Crystal Display" (MVA-LCD) with wide viewing angle is disclosed. The MVA-LCD includes an upper substrate, a lower substrate, a plurality of scan lines provided at the lower substrate in a matrix form and a plurality of data lines, as well as a plurality of pixel cells provided in the pixel areas. The MVA-LCD also includes a plurality of the first means provided in each pixel cell in a parallel form with spaces and a plurality of the second means provided at the upper substrate in a parallel and alternating form with respect to the first means. Moreover, the plurality of the first means and the corresponding plurality of the second means are disposed in a parallel and alternating form and are alternated with respect to each other in spaces. Therefore, the disclination lines are reduced, the transmittance is enhanced, and the response time is shortened. Meanwhile, because the first and second means are set in a cyclic disposition of mirror mapping with one pixel cell corresponding to another one, two pixel cells corresponding to the other two, or three pixel cells corresponding to the other three, the phenomenon of color shift is thereby eliminated.

9 Claims, 8 Drawing Sheets

MULTI-DOMAIN VERTICAL ALIGNMENT LIQUID CRYSTAL DISPLAY WITH WIDE VIEWING ANGLE

BACKGROUND OF THE INVENTION

1. Field of the Invention

The invention relates to a "Multi-domain Vertical Alignment Liquid Crystal Display" (MVA-LCD) with wide viewing angle, and particularly to an MVA-LCD that can reduce the disclination lines and shorten the response time of the nematic crystal molecules.

2. Description of the Related Art

The current MVA-LCD technologies utilize an electrode such as a protrusion, a slit of a glass-coated ITO (Indium Tin Oxide), or an ITO to generate an irregular electric field within the boundary of the electrode when a voltage is applied. The irregular electric field makes the nematic LC (liquid crystal) molecules orient to different directions so as to divide a pixel into multiple domains. For the most MVA-LCD technologies, if they are classified according to the orienting directions of the nematic LC molecules when the voltage is applied, these domains are classified into four directions.

Figure 1:
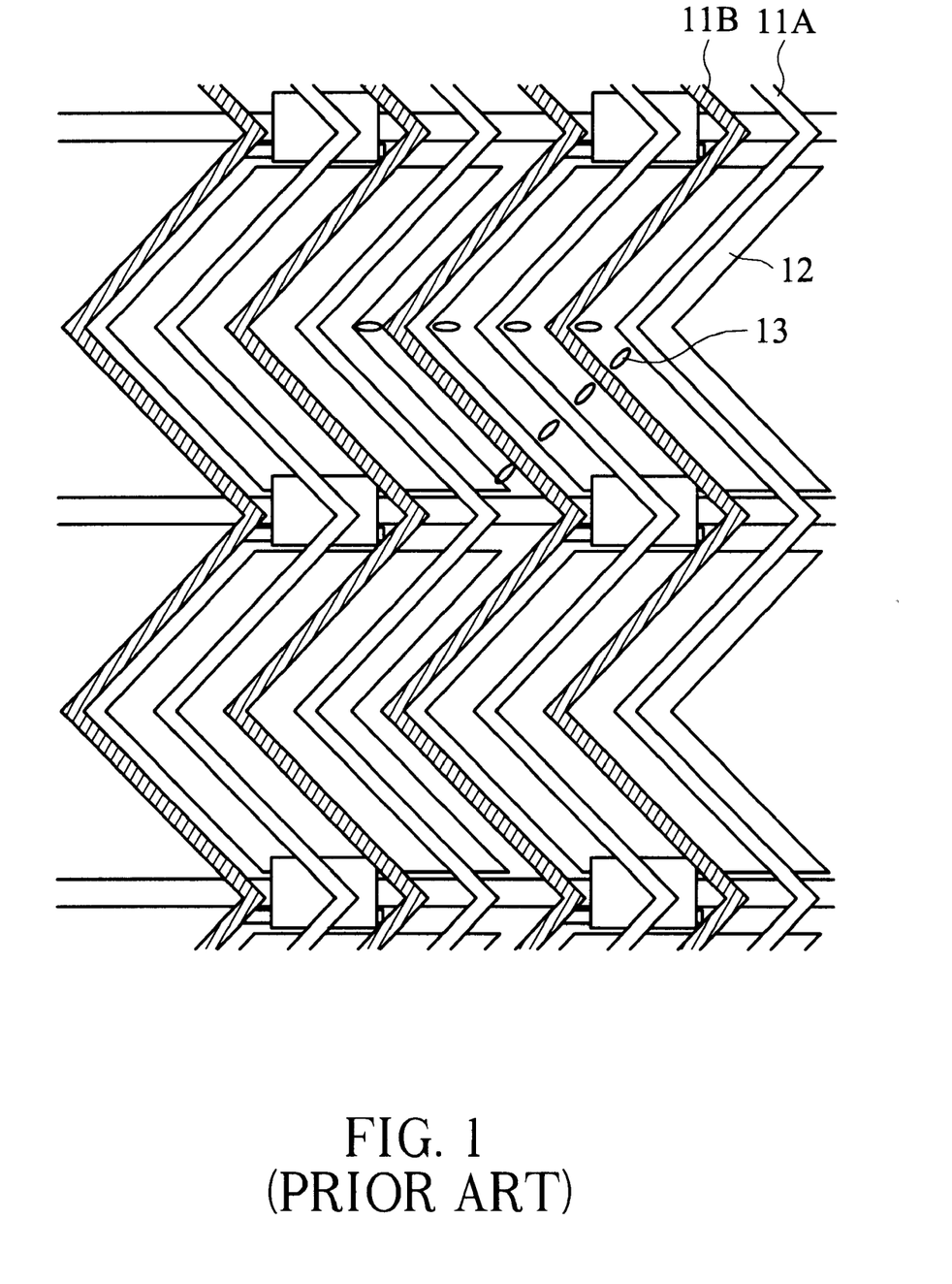
FIG. 1 is a plan view for an MVA-LCD of the prior art.

As shown in FIG. 1, a type of continuous zigzag protrusion structure 11A and 11B of the vertical-aligned LCD is disclosed according to the European Patent No. EP 0884626. The zigzag protrusions 11A and 11B are continuously disposed onto every pixel 12 so as to make the nematic LC molecules 13 in between the two substrates orient to four directions to generate four domains. Thus, this technique can improve the symmetry of viewing angle and eliminate the phenomenon of color shift at large viewing angle but can inevitably generate disclination lines at the tip areas of protrusions in the zigzag protrusion 11A and 11B. Such disclination lines not only result in the dark optical texture on the LCD, but also lower the transmittance of the LCD. Furthermore, since the electric fields at the tip areas of protrusions in the zigzag protrusion 11A and 11B are in an unstable state in the initial stage when the voltage is applied, the nematic LC molecules 13 in such areas are unable to orient toward a fixed direction steadily. Therefore, a negative effect is generated with respect to the response time. Consequently, the more the domains are, the better effect can be obtained to eliminate the color shift phenomenon, and the better result can also obtained to improve the symmetry of viewing angle according to the above mentioned statements. However, the more domains for the tilting of nematic LC molecules are provided, the more disclination lines are generated.

For resolving the dark optical textures due to the disclination lines and the negative effect with respect to the response time, a structure of MVA-LCD with "back-side exposure" (BSE) is proposed. However, the protrusions must be provided on both the upper and the lower substrates in the BSE type MVA-LCD. Furthermore, since the protrusion structure at the substrate with a color filter is more complicated than the regular protrusions, the protrusion structure at the substrate with a color filter must be controlled by the special manufacturing processes. Therefore, the production yield is not easy to be attained.

SUMMARY OF THE INVENTION

One of objects of the invention is to provide a MVA-LCD wherein the first and second means for controlling the tilting directions of Nematic LC molecules are provided on the pixel cells at the upper and lower substrates respectively while the first and second means are not connected to each other. Therefore, it can achieve the reduction of the disclination lines, enhance the brightness, and shorten the response time. Besides, the tilting angles of the first and second means are set in a cyclic disposition of mirror mapping wherein one upper pixel cell is corresponding to one lower pixel cell, two upper pixel cells are corresponding to two lower pixel cells, three upper pixel cells are corresponding to three lower pixel cells, and so on. Thus, the phenomenon of color shift is eliminated while the characteristics of high contrast ratio and wide viewing angle of the regular MVA-LCD are maintained at the same time.

Another object of the invention is to provide protrusions or slits of ITO being simple in structure in order to improve the production yield. Furthermore, since the structure of protrusions or the slits of ITO of the invention employs a single pixel cell as a design unit. Therefore, the invention is applicable to various sizes of products without the necessity of altering the structural design of the protrusions or the slits of ITO.

BRIEF DESCRIPTION OF THE DRAWINGS

These and other objects, features and advantages of the invention will become apparent with reference to the following description and accompanying drawings as follow.

DETAIL DESCRIPTION OF THE INVENTION

The embodiments of a "Multi-domain Vertical Alignment Liquid Crystal Display" (MVA-LCD) according to the invention are illustrated with reference of the accompanying drawings as follows.

Figure 6:
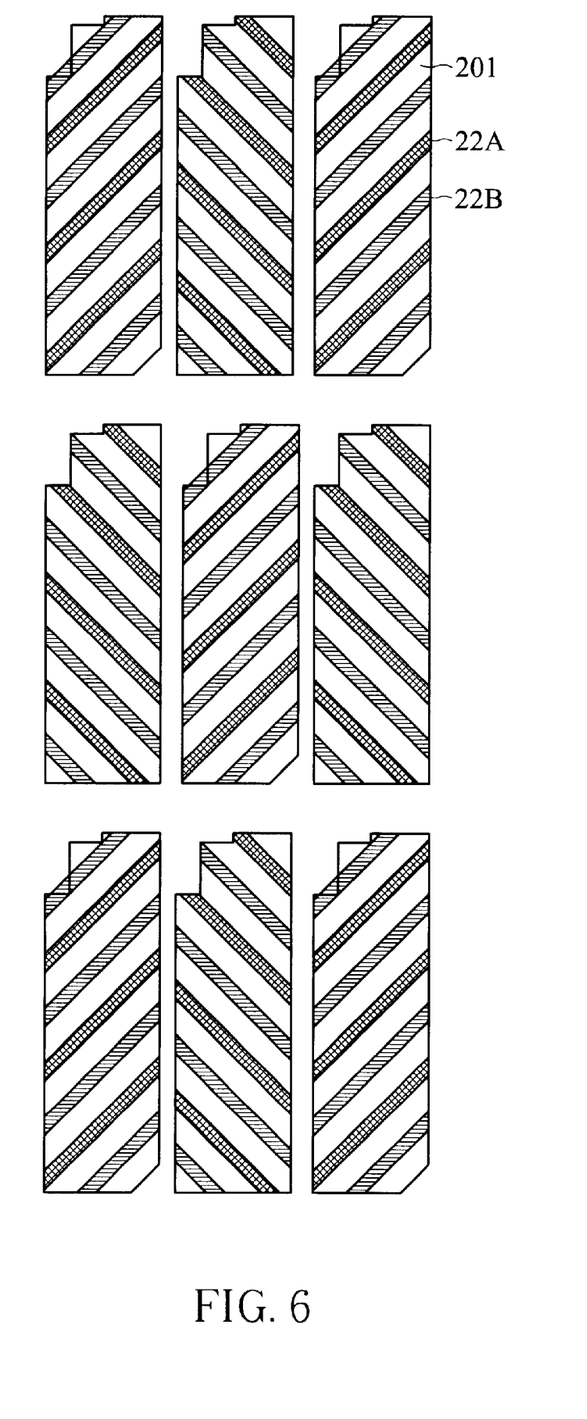
FIG. 6 shows a plan view of an disposition of mirror mapping of the means for controlling the tilting directions of Nematic LC molecules in the pixel cells according to the invention.

FIG. 6 shows a plan view of the first embodiment according to the invention in which the means for controlling the tilting directions of nematic liquid crystal molecules (LC) are set as the one-to-one disposition of mirror mapping. Among them, the tilting angles of the first means 22B and the second means 22A in every pixel cell 201 are set in the disposition of mirror mapping with respect to the tilting angles of the means in each adjacent pixel cell 201 at both sides as well as above and below. The disposition is in the one-to-one cyclic order for eliminating the phenomenon of color shift at a wide viewing angle. Other embodiments of the invention are also disposed likewise.

Figure 7:
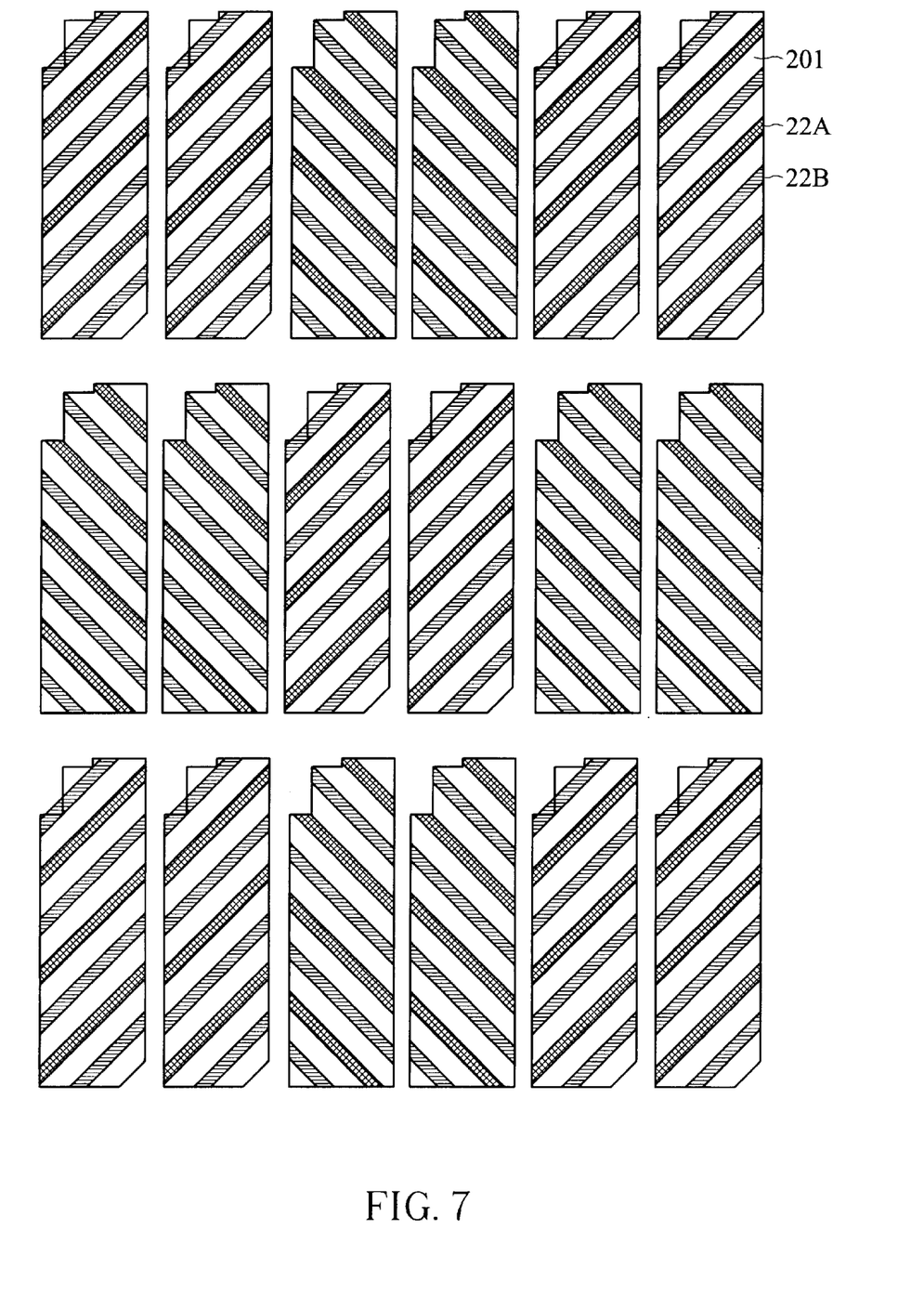
FIG. 7 shows a plan view of another disposition of mirror mapping of the means for controlling the tilting directions of Nematic LC molecules in the pixel cells according to the invention.

FIG. 7 shows a plan view of a two-to-two disposition of mirror mapping of the means for controlling the tilting directions of nematic LC molecules in the pixel cells of the first embodiment according to the invention. Moreover, the tilting angles of the first means 22B and the second means 22A in every two pixel cells 201 are set in the disposition of mirror mapping with respect to the tilting angles of the means in every two adjacent pixel cells 201 at both sides as well as above and below. The disposition is in the two-to-two cyclic order for eliminating the phenomenon of color shift at a wide viewing angle. Other embodiments of the invention are also disposed likewise.

Figure 8:
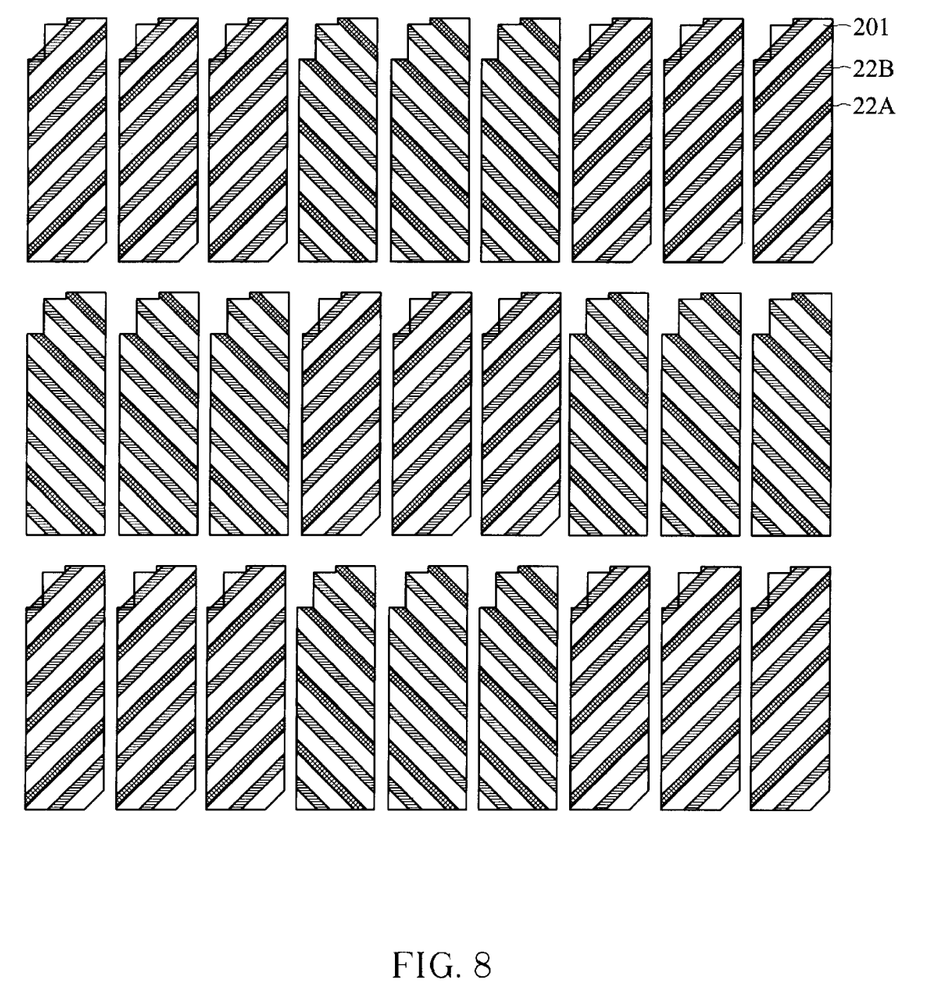
FIG. 8 shows a plan view of one other disposition of mirror mapping of the means for controlling the tilting directions of nematic LC molecules in the pixel cells according to the invention.

FIG. 8 shows a plan view of a three-to-three disposition of mirror mapping of the means for controlling the tilting directions of nematic LC molecules in the pixel cells of the first embodiment according to the invention. Moreover, the tilting angles of the first means 22B and the second means 22A in every three pixel cells 201 are set in the disposition of mirror mapping with respect to the tilting angles of the means in every three adjacent pixel cells 201 at both sides as well as above and below. The disposition is in the three-to-three cyclic order for eliminating the phenomenon of color shift at a wide viewing angle. Other embodiments of the invention are disposed likewise.

Figure 2A:
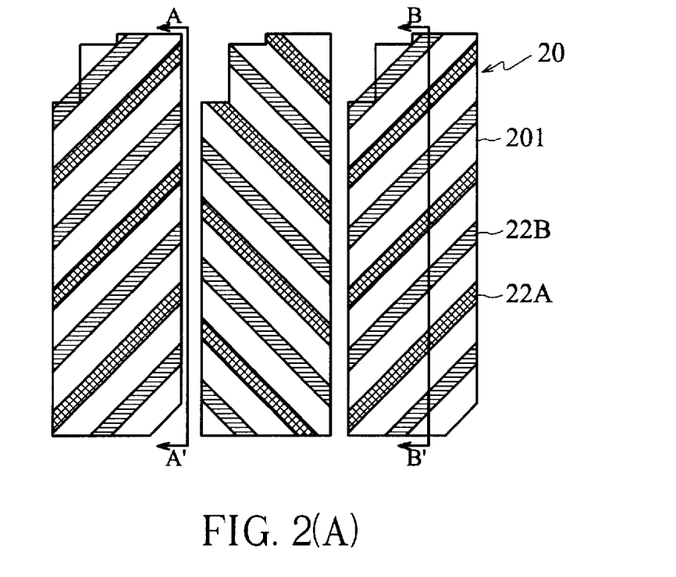
FIG. 2A is a plan view of a pixel area for one of the embodiments according to the invention.
Figure 2B:
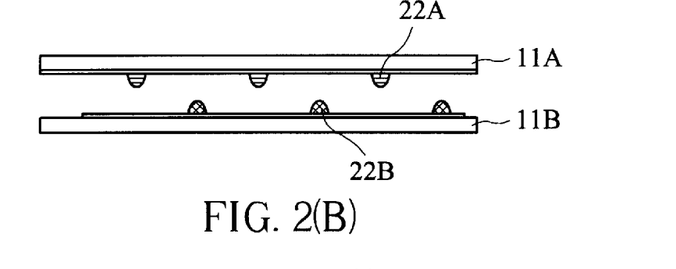
FIG. 2B is a side view in A–A' direction of FIG. 2A.
Figure 2C:
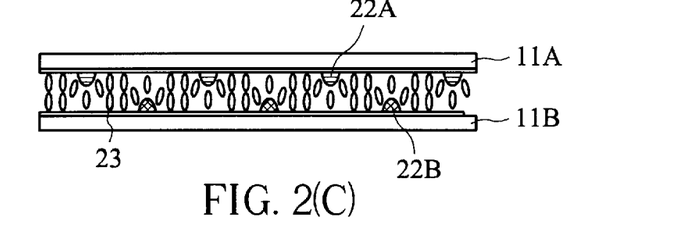
FIG. 2C is a cross-sectional view in B–B' direction with nematic LC molecules without applying the voltage of electric field of FIG. 2A.

Among the drawings, FIGS. 2A through 2D show a plan view, a side view in A–A' direction, and the cross-sectional views in B–B' direction with Nematic LC molecules when a voltage for electric field is and is not applied of a pixel area of the first embodiment according to the invention. As shown in FIG. 2A, a plurality of the first means 22B and the second means 22A are provided on the lower and the upper substrates 11B and 11A respectively in a parallel and inclined form with space between each other. Moreover, the first means 22B and the second means 22A are the protrusions in a parallel and alternating form (as shown in FIG. 2B). Furthermore, a layer of the nematic LC molecules 23 with negative dielectric constant anisotropy is inserted in between the upper and the lower substrates 11A and 11B (as shown in FIG. 2C).

As shown in FIG. 2C, under the condition that the voltage of the electric field is not applied to the lower substrates 11A and 11B, all the nematic LC molecules 23 are perpendicularto the upper and the lower substrates 11A and 11B except those nematic LC molecules near the surfaces of the first protrusions 22B and the second protrusions 22A.

Figure 2D:
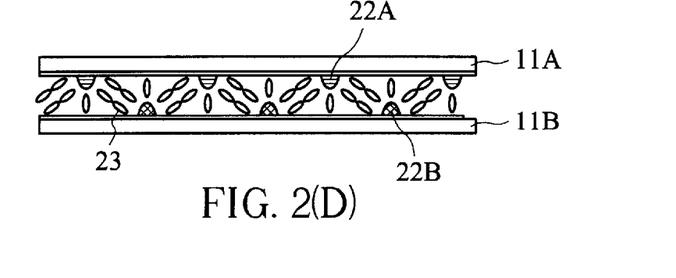
FIG. 2D is a cross-sectional view in B–B' direction with nematic LC molecules under the application of the voltage of electric field of FIG. 2A
Figure 3A:
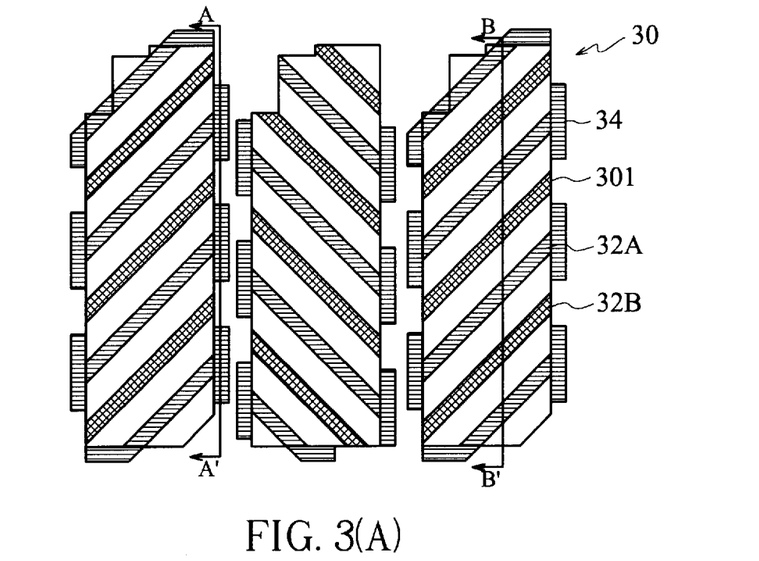
FIG. 3A is a plan view of a pixel area for one of the embodiments according to the invention.
Figure 3B:
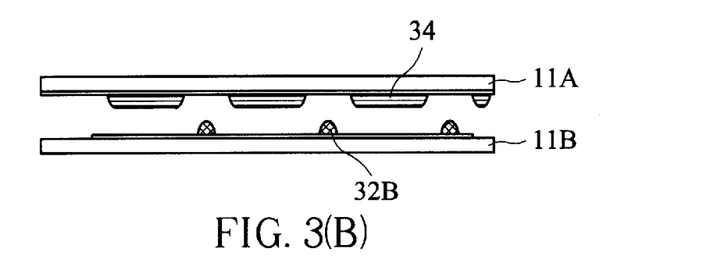
FIG. 3B is a side view in A–A' direction of FIG. 3A.
Figure 3C:
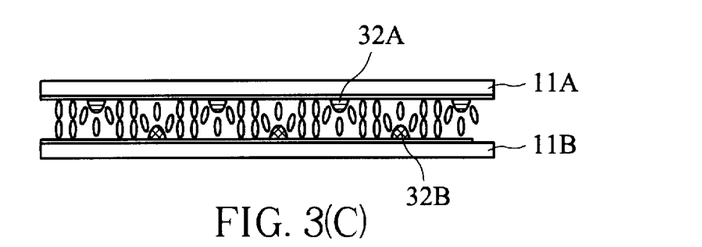
FIG. 3C is a cross-sectional view in BB' direction with Nematic LC molecules of FIG. 3A without applying the voltage for electric field.
Figure 3D:
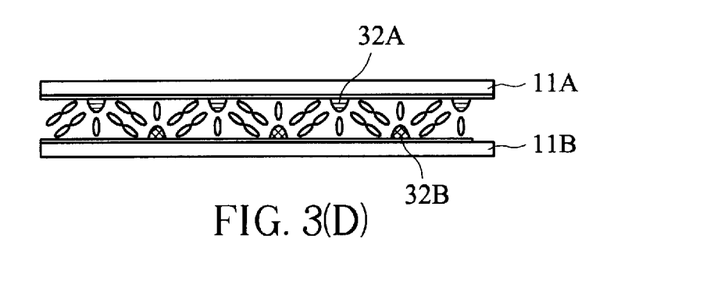
FIG. 3D is a cross-sectional view in BB' direction with Nematic LC molecules of FIG. 3A under the application of the voltage for electric field
Figure 4A:
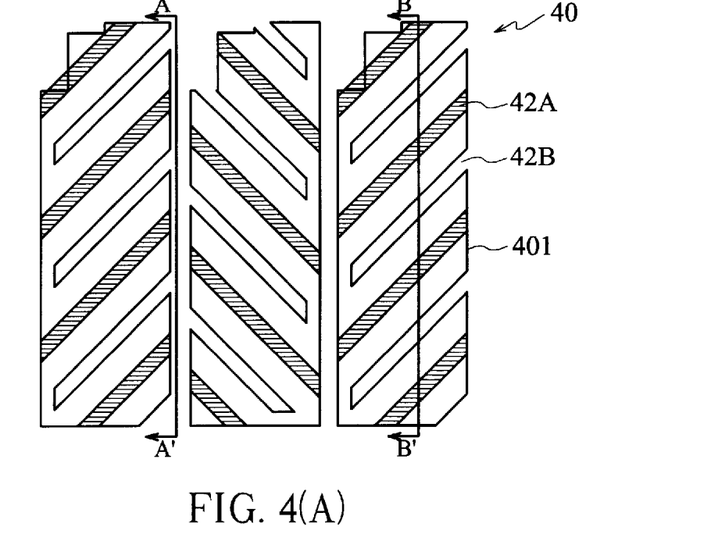
FIG. 4A is a plan view of a pixel area for one of the embodiments according to the invention.
Figure 4B:
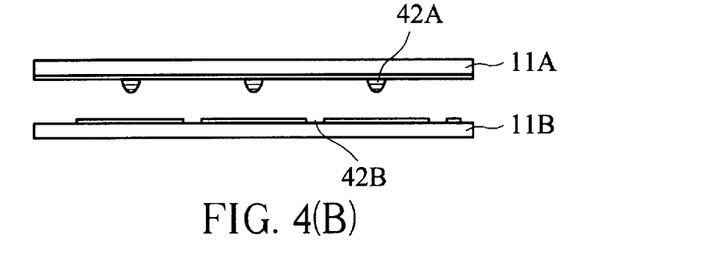
FIG. 4B is a side view in A–A' direction of FIG. 4A.
Figure 4C:
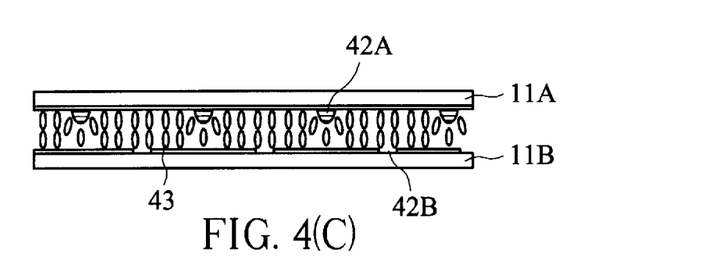
FIG. 4C is a cross-sectional view in B–B' direction with Nematic LC molecules of FIG. 4A without applying the voltage for electric field.
Figure 4D:
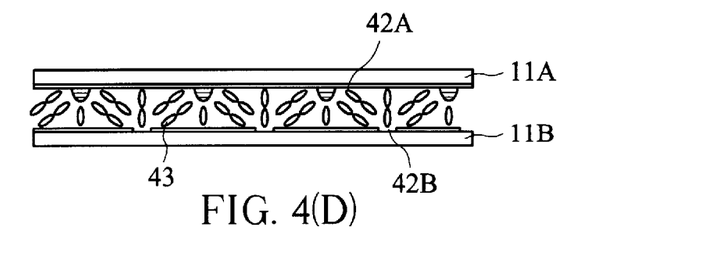
FIG. 4D is a cross-sectional view in BB' direction with Nematic LC molecules of FIG. 4A under the application of the voltage for electric field.
Figure 5A:
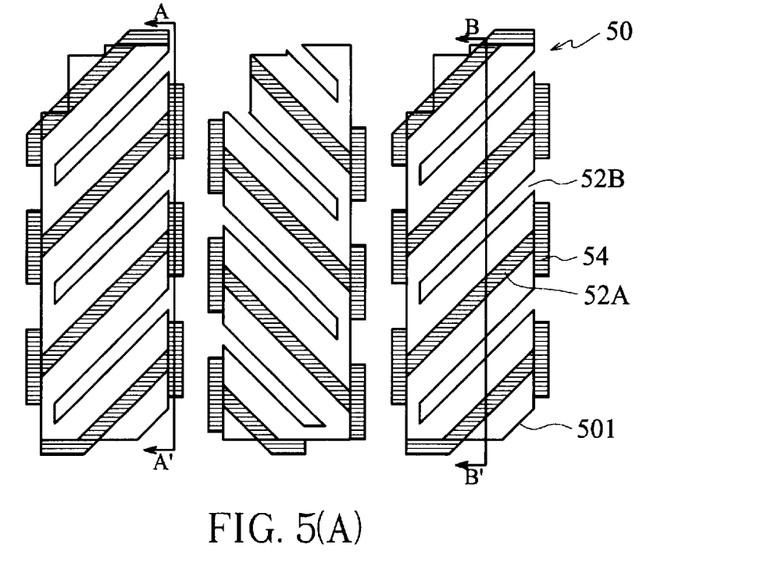
FIG. 5A is a plan view of a pixel area for one of the embodiments according to the invention.
Figure 5B:
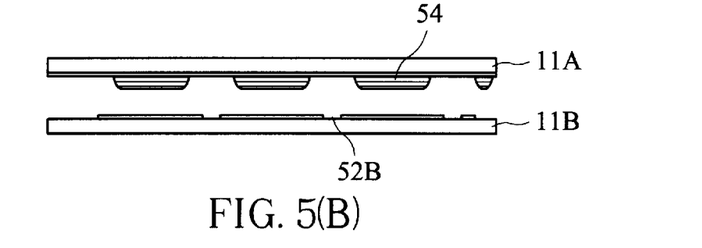
FIG. 5B is a side view in A–A' direction of FIG. 5A.
Figure 5C:
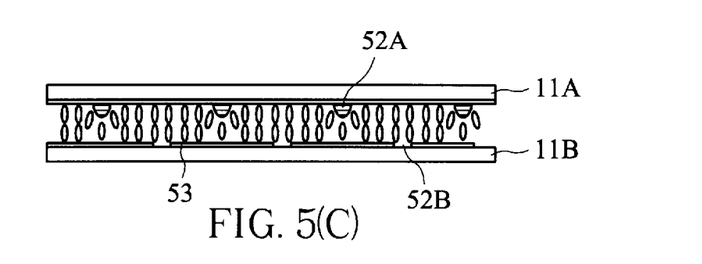
FIG. 5C is a cross-sectional view in BB' direction with nematic LC molecules of FIG. 5A without applying the voltage for electric field.
Figure 5D:
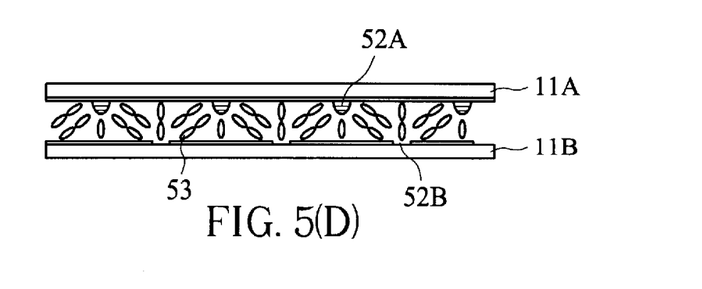
FIG. 5D is a cross-sectional view in B–B' direction with nematic LC molecules of FIG. 5A under the application of the voltage for electric field.

As shown in FIG. 2D, when the rated voltage for electric field is applied to the upper and the lower substrates 11A and 11B, the nematic LC molecules 23 tilt in the parallel direction with respect to the upper and the lower substrates 11A and 11B. The first protrusions 22B and the second protrusions 22A in the pixel area 20 are not connected to each other to become zigzag protrusions (referring to FIG. 1). Therefore, the disclination lines that are conventionally generated by the nematic LC molecules in the tip areas of the zigzag protrusion as shown FIG. 1 are avoided so as to prevent the generation of dark optical texture as well as to enhance the brightness. Besides, since the first protrusions 22B and the second protrusions 22A have their zigzag shape disconnected, they do not have any tip. The nematic LC molecules 23 do not result in unstable state in the initial stage when the voltage of electric field is applied so as to shorten the response time. Therefore, the MVA-LCD with wide viewing angle of the invention can maintain the characteristics of high contrast ratio and wide viewing angle of the regular MVA-LCD.

FIGS. 3A through 3D show a plan view, a side view in A–A' direction, and the cross-sectional views in B–B' direction with Nematic LC molecules when the voltage of electric field is and is not applied of a pixel area of the second embodiment according to the invention. Moreover, the first means 32B on the lower substrate 11B and the second means 32A on the upper substrate 11A are the protrusions that are not connected to each other. Moreover, the additional protrusions 34 are grown at either end of each of the second protrusions 32A along the boundary of every pixel cell 301 in the pixel area 30. The protrusions 34 are for eliminating the phenomenon of non-uniform electric field at the boundary of pixel cell 301 so as to reduce the disclination lines of Nematic LC molecules at the boundary of the pixel cell 301. Therefore, the generation of dark optical texture is reduced and the brightness is enhanced.

FIGS. 4A through 4D show a plan view, a side view in A–A' direction, and the cross-sectional views of nematic LC molecules in B–B' direction when the voltage for electric field is and is not applied of a pixel area of the third embodiment according to the invention. Moreover, the first means 42B on the lower substrate 11B is a slit of a glass coated with Indium Tin Oxide (ITO) while the second means 42A on the upper substrate 11A is a protrusion. The third embodiment can attain the similar object like the aforesaid protrusions for controlling the tilting directions of the nematic LC molecules by modifying the pattern etched on the ITO. In addition, the third embodiment can also reduce the manufacturing steps as far as the protrusions for controlling the tilting directions of the nematic LC molecules are concerned.

FIGS. 5A through 5D show a plan view, a side view in A–A' direction, and the cross-sectional views in B–B' direction with Nematic LC molecules when the voltage of electric field is and is not applied of a pixel area of the fourth embodiment according to the invention. Moreover, the first means 52B at the lower substrate 11B is a slit of an ITO while the second means 52A at the upper substrate 11A is a protrusion. Further, the additional protrusions 54 are grown at both end of each of the second protrusion 52A along the boundary of every pixel cell 501 in the pixel area 50. The protrusions 54 are for eliminating the phenomenon of non-uniform electric field at the boundary of pixel cell 501 so as to reduce the disclination lines of nematic LC molecules at the boundary of the pixel cells 501. Therefore, the generation of dark optical texture is reduced and the brightness is enhanced.

For the first and second means for controlling the tilting directions of the nematic LC molecules of the embodiments shown in FIGS. 2A, 3A, 4A, and 5A, the most preferred angle in between the longitudinal axis of the means (protrusion or slit) and the boundary of pixel cells is 45-degree. However, it is also preferred that the angle in between the longitudinal axis of the first and second means (protrusion or slit) and the boundary of pixel cells is ranging from 30-degree to 70-degree.

It should be understood that various alternatives to the structures described herein may be employed in practicing the invention. It is intended that the following claims define the invention and that the structure within the scope of these claims and their equivalents be covered thereby.

What is claimed is:

1. A multi-domain vertical alignment liquid crystal display (MVA-LCD) with wide viewing angle having an upper substrate, a lower substrate, and a plurality of pixel areas that are defined by a plurality of scan lines and a plurality of data lines provided at the lower substrate in a matrix form and each of the pixel area having at least a pixel cell, wherein the pixel cell comprising:

a plurality of the first means for controlling tilting directions of the nematic liquid crystal (LC) molecules provided in each of the pixel cell in a parallel form having spaces; and a plurality of the second means for controlling the tilting directions of nematic LC molecules provided at the upper substrate in a parallel and alternating form with respect to said first means;

wherein tilting angles of said first and said second means in each of the pixel cell adjacent to each other are set in a disposition of mirror mapping in a cyclic order of one-pixel to one-pixel, two-pixel to two-pixel, or three-pixel to three-pixel for eliminating a phenomenon of color shift at wide viewing angle.

2. The MVA-LCD with wide viewing angle of claim 1, wherein the pixel area further comprising a pixel cell for monochrome display.

3. The MVA-LCD with wide viewing angle of claim 1, wherein the pixel area further comprising three pixel cells in three different colors for color display.

4. The MVA-LCD with wide viewing angle of claim 1 or claim 2 or claim 3, wherein said first means and said corresponding second means are inclined protrusions that are parallel and with spaces so as to reduce the disclination lines, to enhance the transmittance, and to shorten the response time.

5. The MVA-LCD with wide viewing angle of claim 4, wherein additional protrusions are further grown at both ends of each of said second means along the boundary of every pixel cell in the boundary areas of the pixel cells for eliminating a phenomenon of non-uniform electric field at the boundary of the pixel cell.

6. The MVA-LCD with wide viewing angle of claim 1 or claim 2 or claim 3, wherein said first means are inclined slits in parallel form and with spaces while said second means are inclined protrusions in parallel form with spaces with respect to said first means so as to reduce the disclination lines, to increase the transmittance, and to shorten the response time.

7. The MVA-LCD with wide viewing angle of claim 6, wherein additional protrusions are further grown at both end of each of said second means along the boundary of every pixel cell in the boundary areas of the pixel cells for eliminating a phenomenon of non-uniform electric field at the boundary of the pixel cell.

8. The MVA-LCD with wide viewing angle of any one of claim 5 or claim 6 or claim 7, wherein the angle between the respective longitudinal axes of said first means and said second means for controlling the tilting directions of nematic LC molecules and the boundary of pixel cell is 45 degrees.

9. The MVA-LCD with wide viewing angle of any one of claim 5 or claim 6 or claim 7, wherein the angle between the respective longitudinal axes of said first means and said second means for controlling the tilting directions of nematic LC molecules and the boundary of pixel cell ranges between 30 degrees and 70 degrees.

* * * * *